(No Model.)

H. A. WATTSON.
SOLE FOR RUBBER BOOTS AND SHOES.

No. 292,711. Patented Jan. 29, 1884.

WITNESSES:
Chas. Nida
C. Sedgwick

INVENTOR:
H. A. Wattson
BY Munn & Co
ATTORNEYS.

UNITED STATES PATENT OFFICE.

HENRY A. WATTSON, OF GRANITE, COLORADO.

SOLE FOR RUBBER BOOTS AND SHOES.

SPECIFICATION forming part of Letters Patent No. 292,711, dated January 29, 1884.

Application filed June 4, 1883. (No model.)

*To all whom it may concern:*

Be it known that I, HENRY A. WATTSON, of Granite, in the county of Chaffee and State of Colorado, have invented a new and useful Improvement in Soles for Rubber Boots and Shoes, of which the following is a full, clear, and exact description.

Reference is to be had to the accompanying drawings, forming a part of this specification, in which similar letters of reference indicate corresponding parts in both figures.

Figure 1:
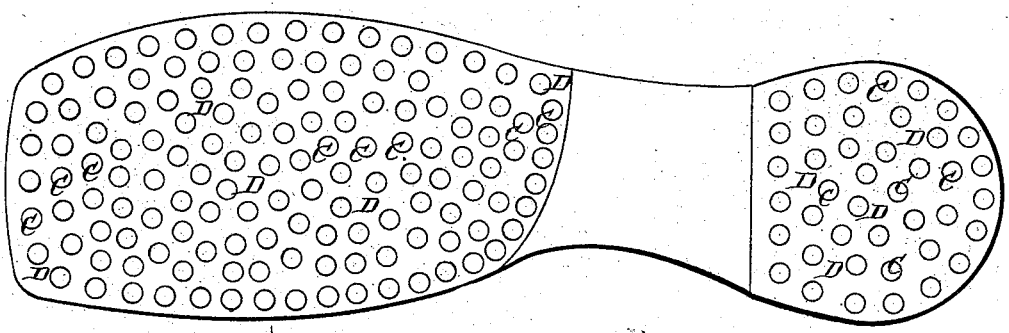
Figure 2:
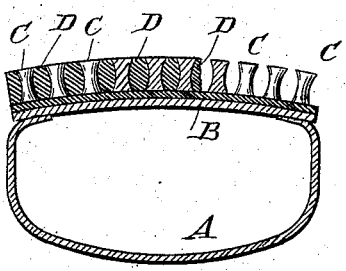

Figure 1 represents the sole of a rubber boot illustrating my improvement. Fig. 2 is a section of the same, taken through the line $x\,x$, Fig. 1, and part being broken away.

The object of this invention is to increase the durability of rubber boots and shoes.

The invention consists in a sole for rubber boots and shoes made with metallic studs embedded in the solid body of the sole, as will be hereinafter fully described.

In carrying my invention into practical effect the upper A and the inner part, B, of the sole are made in the ordinary manner. Upon the part B of the sole while still warm and soft are placed studs C of metal, which may be made of any desired or suitable size and shape, and between and around the said studs is poured melted rubber D, so that the said studs C will be embedded in the said rubber, and will be cemented to the inner part, B, of the sole, forming a solid concrete sole. With this construction the sole is not pierced, as is the case when nails are driven through it from either the inner or outer side, which punctures become enlarged by the use of the boot or shoe and cause leakage.

With my improvement the studs C, being embedded in the solid rubber D, will not work either inward or outward, but will be held securely in place, and will very greatly increase the durability of the sole.

This improvement is specially intended for miner's boots and shoes, and will so greatly increase their durability that the soles will wear for four months instead of wearing out in one month, as is the case with the soles of ordinary rubber boots and shoes.

I am aware that it is not new to use a toothed ring in a vulcanized rubber heel; but

What I claim as new and of my invention is—

A rubber heel or sole formed of the inner part, B, the concave studs C, and the molded rubber D, substantially as shown and described.

HENRY A. WATTSON.

Witnesses:
D. W. MCKENZIE,
R. H. BUCK.